Sept. 3, 1957  S. A. BALKAN  2,804,652
METHOD OF STRETCHING PLASTIC MATERIALS
Filed Dec. 21, 1954
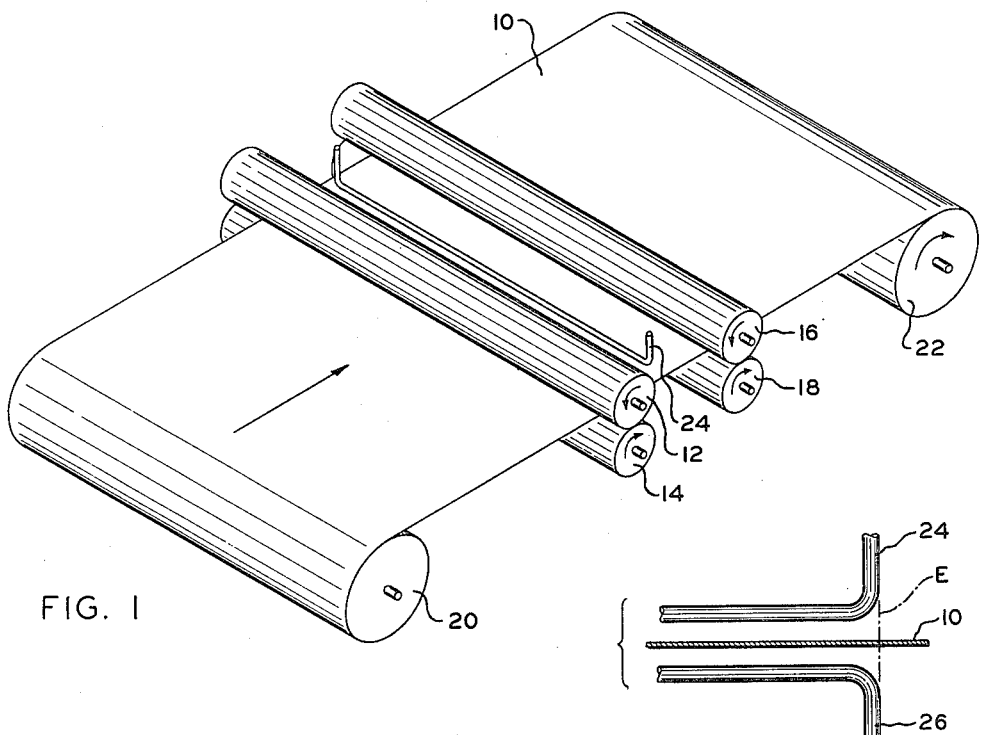
FIG. 1
FIG. 3
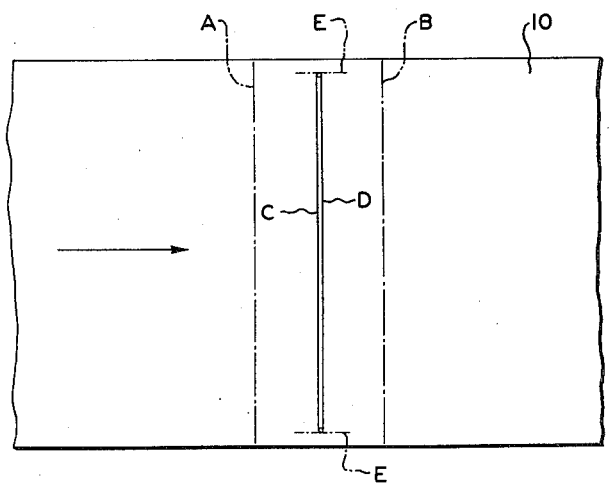
FIG. 2
INVENTOR
Samuel A. Balkan
BY Brown and Mikulka
ATTORNEYS

United States Patent Office 2,804,652
Patented Sept. 3, 1957

2,804,652

METHOD OF STRETCHING PLASTIC MATERIALS

Samuel A. Balkan, Newton Highlands, Mass., assignor to Polaroid Corporation, Cambridge, Mass., a corporation of Delaware Application December 21, 1954, Serial No. 476,624

5 Claims. (Cl. 18—48)

The present invention relates generally to the processing of continuous sheets of extensible organic plastic material and the like and, as illustrated herein, relates more particularly to the longitudinal stretching of such materials under conditions whereby the width of the stretched sheet is substantially the same as the width of the unstretched sheet.

One object of the present invention is to provide a process for stretching continuous sheet materials by the continuous controlled application of opposed tensional forces which act lengthwise of the sheet and substantially uniformly thereacross at spaced-apart locations with respect to each other, to draw and move the sheet lengthwise of itself while applying a longitudinal stretch to the sheet which lengthens and thins the sheet without any appreciable diminution in its width dimension.

A further object of the invention resides in a method of stretching a continuous material such as extensible thermoplastic sheeting wherein the material is subjected to the action of a pair of tensional forces applied to act respectively in opposite directions and lengthwise of the material and substantially uniformly thereacross and at locations spaced apart a distance less than the width possessed by the material prior to being subjected to stretching and heating the material along a relatively narrow band extending transversely of the sheet and terminating short of the edges thereof as the sheet moves between the sets of rolls, the material extending beyond the ends of the softened band being softened to a lesser degree than the uniformly heated portions of the band whereby the edge portions of said material are rendered less readily deformable than the remainder of said softened band, thus restraining the narrowing of the sheet as it is stretched lengthwise.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawing wherein:

Figure 1 is a perspective view of one form of apparatus for carrying out the stretching practices of the present invention;

Fig. 2 is a diagrammatic view of a sheet undergoing a stretching operation illustrating the width characteristics of the sheet before, during and after stretching; and Fig. 3 is a vertical sectional view illustrating the relative position of the ends of the heater elements and the edge of the sheet.

The stretching of plastic organic sheet materials to effect a change in the physical or optical properties of the sheet or both is well known. The purpose of stretching the sheet material may be either to increase the tensile strength of the sheet with changes in its various dimensions or to change the optical properties of the sheet by orienting particles, such as molecules or crystals suspended therein, to render the sheet material birefringent.

The molecular orientation of plastic sheet material by stretch processing is described and claimed in United States Letters Patent No. 2,547,736, granted April 3, 1951, on an application filed in the name of Robert P. Blake, and United States Letters Patent No. 2,547,763, granted April 3, 1951, on an application filed in the names of Edwin H. Land and William H. Ryan. Each of these patents is concerned with the stretching of organic plastic materials to orient the molecules thereof to render the sheet birefringent. The sheet materials processed by the methods set forth in said patents are being successfully used in making a variety of optical elements such as polarizers, filters, optical and goggle lenses, wave retardation elements and the like.

The methods disclosed in the above-mentioned patents are particularly designed to produce sheet materials having high birefringence which, when treated with suitable dichroic dyes or stains, form highly effective polarizers, but the production of such stretched sheets has resulted either in substantial widthwise narrowing of the sheet or in areas adjacent to each edge of the sheet having substantially higher birefringence than the remainder of the sheet or both. In any case, the widthwise dimension of the stretched sheet in terms of commercially usable sheet material for optical purposes is substantially reduced. Such losses have heretofore been treated as unavoidable. Lateral forces which are set up during the stretching of the material and which endeavor to restrain it from narrowing are not uniform in magnitude across the transverse extent of the material. Consequently, the birefringence of the stretched sheet will vary and will be greatest adjacent to the edge portion of the sheet where the greatest narrowing of the sheet material takes place. The edge areas at each side edge of the sheet where these higher birefringences are present extend inwardly from the edge of the sheet as much as three or four inches depending upon the method used in stretching the sheet. In the so-called "long stretch" method disclosed in the earlier of the two above-mentioned patents, narrowing of the stretched sheet is substantial and the stretched width may amount to only 30% of the width of the unstretched sheet. In the "long stretch" application, the birefringence widthwise of the sheet is reasonably uniform and little if any high birefringence areas adjacent to the edge portions of the sheet are found. On the other hand, however, if the material is stretched by the process set forth in the patent to Land et al., widthwise narrowing of the sheet is substantially reduced. However, in this case high birefringence areas adjacent to the edges of the sheet are produced and extend inwardly from each edge as much as three inches or even more depending upon the original width of the plastic sheet. The birefringence of the material between the edge areas increases somewhat from the center line of the sheet toward the edges thereof, but the variation in birefringence of the center portion of the sheet between the high birefringence edge areas is within permissible limits.

The narrowing of plastic sheet material under the application of longitudinal stretching forces is the result of forces which act from the edges toward the center line of the sheet. It is apparent that when the sheet is softened from edge to edge and the transverse zone of softer material is relatively wide, the resistance to these forces is substantially reduced and substantial narrowing of the sheet results.

The lateral forces which are set up during stretching sheet material and which endeavor to restrain it from narrowing are of least magnitude adjacent to the edges of the sheet and increase toward the center line of the material. It is for this reason that the greatest narrowing of the material takes place adjacent to the side edges of the material. It has been found, however, that by limiting or restricting the softened area narrowing as a result of stretching is again further substantially reduced. For example, as set forth in application Serial No. 475,133, filed December 14, 1954, in the name of William H. Ryan, if the transverse zone of softened material is restricted or limited to a very narrow band or line extending entirely across the sheet, very little narrowing of the stretched sheet takes place. While this method produces a sheet wherein the edge areas are substantially reduced, there still is some loss of processed material which must be cut away to produce a commercially acceptable birefringent sheet.

The present invention contemplates softening the sheet uniformly along a very narrow transverse band to within a short distance of the side edge portions of the sheet and softening the extreme side edge portions to a substantially lesser extent than the major transverse portion of the sheet with the result that these edge portions resist distortion and further prevent narrowing of the sheet even though the forces which tend to cause such narrowing are greatest adjacent to said side edges.

Apparatus employing spaced-apart sets of pressure rolls may be conveniently employed for carrying out the improved practices of the present invention. Suitable apparatus for this purpose is illustrated in Figs. 1 and 2 wherein sheet material 10 is shown undergoing processing in a stretching apparatus comprising a pair of input rolls 12 and 14 located on axes spaced about 6½ inches from the axes of a pair of output rolls 16 and 18. The axial spacing, however, varies and may be somewhat less than the distance noted just above or it may be greater depending upon the diameter of the input and output rolls. The input and output rolls are of substantially the same diameter and are rotatably mounted in superposed relation in a suitable stand by conventional means which allow the upper rolls 12 and 16 in the respective roll sets to be releasably held in pressure contact with the corresponding lower rolls 14 and 18. In Fig. 1, the axes of the various rolls are parallel to each other in both horizontal and vertical planes although other arrangements may be employed if so desired. For example, one roll stand may be elevated with respect to the other. Likewise, similar but higher roll stands could be provided wherein three or more rolls could be used in each set.

The input rolls 12 and 14 are driven by any suitable means such as a conventional gear box (not shown) at a lower peripheral speed than are the output rolls 16 and 18 which have a peripheral speed of approximately 20 feet per minute, or greater if so desired. As a practical matter, the speed is limited only by the heat supply. As shown, only the lower rolls are positively driven. The upper rolls of each set, although freely rotatable, are in pressure contact with the lower rolls 14 and 18, and will accordingly be rotated at substantially the same peripheral speed as the driven roll in that set. The gear box referred to above is driven from a suitable source of power, such as an electric motor. The power take-off shafts of a gear box are rotated at the speed differences required to provide desired speed ratios for the input and output rolls. The speed ratio for the input and output rolls may be in the order of one to three, although it is apparent that smaller and greater ratios could be used if so desired.

Material 10, such as polyvinyl alcohol sheeting, is obtained from a stock roll 20, which is rotatably mounted at one end of the machine, and the sheet 10 is drawn between the input rolls 12 and 14 and between the output rolls 16 and 18, and thence is wound up on a take-up roll 22. The input and output rolls are spaced apart longitudinally of the sheet 10, as stated above, at a distance sufficient at least to provide space for heating or softening the sheet as it is drawn between the two sets of rolls.

The softening means illustrated herein comprises a pair of electrically heated elements 24 and 26, one being mounted above and the other below the sheet 10. Preferably as is shown in Fig. 1, the heater elements 24 and 26 are located substantially nearer the input than the output rolls, although this relation may be varied if so desired. The heater elements 24 and 26 are spaced apart a distance of about 5/16 of an inch from the upper and lower surfaces of the sheet 10. It is to be noted, as shown best in Fig. 3, that the ends of the heater elements 24 and 26 are bent away from the sheet 10 and inwardly from the edge thereof. While Fig. 3 shows only the right hand edge of the sheet, the same relation between the ends of the heater elements 24 and 26 exists at the left end of the sheet. The heater elements 24 and 26, as shown, terminate or my be bent away from the general plane of the sheet a distance of approximately ½ inch from the edges thereof. Thus, it is apparent that while the major portion of the widthwise extent of the sheet 10 is subjected to uniform heating between the horizontal portions of the heater elements 24 and 26, the portions of the sheet 10 which extend beyond the horizontal portions of the heater and hence transversely beyond the lines E in Figs. 2 and 3, are not softened to the same extent, but instead the heating effect of the elements 24 and 26 is substantially reduced as the distance from the ends or upturned portions of the heaters increases.

Referring now to Fig. 2 of the drawing, the lines A and B represent the lines along which stretching forces are applied to the sheet 10. They represent also the lines of contact between the upper and lower rolls of each set. The lines C and D indicate approximately the extent of the uniformly heated or softened area. It is to be noted that this area is relatively narrow and that it terminates short of the edges of the sheet and represents that portion of the widthwise extent of the sheet which is uniformly heated by the heater elements 24 and 26. When the sheet is advanced in the direction indicated by the arrow in Fig. 2, substantially no stretching occurs between the lines A and C, and it has been noted that the speed of the sheet up to the line C is substantially equal to the peripheral speed of the input rolls 12 and 14.

It has also been noted that the speed of the sheet 10 at and beyond the line D is increased to substantially the peripheral speed of the output rolls 16 and 18. Thus, substantially all of the stretching of the sheet occurs between the lines C and D which define between them substantially the longitudinal extent of the softened area.

The area of the sheet 10 between the lines E and the extreme edges of the sheet, as previously stated, has been softened to a substantially lesser extent than the remainder of the sheet. Since these areas are not softened to the same exent as the portion of the sheet between the lines C and D, the edge portions of a sheet resist distortion to a substantially greater extent and hence are not pulled inwardly to any appreciable extent by the inwardly directed lateral forces which would otherwise cause substantial narrowing of the sheet.

The present method of softening only a limited lengthwise extent of a plastic sheet and stretching, as described above, provides a stretched sheet wherein the birefringence varies only slightly from the edge portions to the center line of the stretched sheet. The less softened edge portions, as stated above, resist distortion and hence prevent more than a minimum of narrowing of the stretched sheet. It is also to be noted that the stretching takes place within a very limited distance lengthwise of the sheet. That is to say, the stretching takes place substantially within the lengthwise limits of the softened area. Since the lengthwise extent of the softened area may be in the order of ½ to 1 inch, and since the speed of the stretched sheet may be in the order of 20 feet per minute, the time interval occupied in stretching is very small. Thus there is little if any opportunity for the inwardly directed lateral forces to cause appreciable narrowing of the sheet. It is to be noted that the longitudinal extent of the softened area and the spread of the stretched sheet are not fixed but may be varied as desired.

The temperature range to be used in stretching plastic materials is relatively wide, and the exact temperature to be used depends primarily upon the thickness of the material to be softened and the speed of the movement of the material past the softening means. It is evident that the rate of movement of the material may vary between relatively wide limits as may also the thickness of the sheet. Ordinarily, in stretching polyvinyl alcohol for the purpose of improving or increasing the orientation or birefringence, stretching temperatures of the order of 350 to 450° F. have been successfully employed. Higher temperatures may be used if so desired, but little if any increase in orientation or birefringence results therefrom. It is evident that the softening temperature may be controlled in any suitable manner. As illustrated, the electrical heating elements 24, 26 may be controlled by any suitable current-controlling device such, for example, as a "Variac" manufactured by General Radio Corporation, Cambridge, Massachusetts.

Since certain changes may be made in the above process without departing from the scope of the invention herein involved, it is intended that all matter contained in the above description or shown in the accompanying drawing shall be interpreted as illustrative and not in a limiting sense.

What is claimed is:

1. A method of longitudinally stretching a continuous sheet material such as an organic plastic sheet material of given thickness while preventing substantial narrowing of said material, said method comprising softening the material uniformly along a relatively narrow band extending transversely of the sheet and terminating short of the edge thereof, softening the material which extends transversely beyond the ends of said band to said edges to a lesser extent than the material within said band whereby the transversely extended portions of the material adjacent the edges of the sheet are rendered less deformable and act to restrain narrowing of the sheet while it is being stretched longitudinally, and subjecting the sheet material to the simultaneous influence of a pair of opposed tensional forces applied to act lengthwise of the material at spaced-apart locations longitudinally of the material to each side of said band and transversely extended portions to draw and move the material lengthwise of itself at a given speed while applying a longitudinal stretch to the material which tends to lengthen and thin it.

2. A method of longitudinally stretching a continuous sheet material such as an organic plastic sheet material of given thickness while preventing substantial narrowing of said material, said method comprising softening the material uniformly along a relatively narrow band extending transversely of the sheet and terminating short of the edges thereof, softening the material which extends transversely beyond the ends of said band to said edges to a gradually lesser extent than the material within said band whereby the transversely extended portions of the material adjacent the edges of the sheet are rendered gradually less deformable and act to restrain narrowing of the sheet while it is being stretched longitudinally, and subjecting the sheet material to the simultaneous influence of a pair of opposed tensional forces applied to act lengthwise of the material at spaced-apart locations longitudinally of the material to each side of said band and transversely extended portions to draw and move the material lengthwise of itself at a given speed while applying a longitudinal stretch to the material which tends to lengthen and thin it.

3. A method of longitudinally stretching a continuous sheet material such as an organic plastic sheet material of given thickness while preventing substantial narrowing of said material, said method comprising softening the material by directing radiated heat toward said material uniformly along a relatively narrow band extending transversely of the sheet and terminating short of the edges thereof, softening the material which extends transversely beyond the ends of said band to said edges to a lesser extent than the material within said band by directing a lesser amount of radiated heat toward said material whereby the transversely extended portions of the material adjacent the edges of the sheet are rendered less deformable than the material within said band and act to restrain narrowing of the sheet while it is being stretched longitudinally, and subjecting the sheet material to the simultaneous influence of a pair of opposed tensional forces applied to act lengthwise of the material at spaced-apart locations longitudinally of the material to each side of said band and transversely extended portions to draw and move the material lengthwise of itself at a given speed while applying a longitudinal stretch to the material which tends to lengthen and thin it.

4. A method of longitudinally stretching a continuous sheet material such as an organic plastic sheet material of given thickness while preventing substantial narrowing of said material, said method comprising softening the material by directing radiated heat toward said material uniformly along a relatively narrow band extending transversely of the sheet and terminating short of the edges thereof, softening the material which extends transversely beyond the ends of said band to said edges to a lesser extent than the material within said band by directing a lesser amount of radiated heat toward said material whereby the transversely extended portions of the material adjacent the edges of the sheet are rendered less deformable and act to restrain narrowing of the sheet while it is being stretched longitudinally, and subjecting the sheet material to the simultaneous influence of a pair of opposed tensional forces applied to act lengthwise of the material at spaced-apart locations longitudinally of the material to each side of said band and transversely extended portions to draw and move the material lengthwise of itself at a given speed while applying a longitudinal stretch to the material which tends to lengthen and thin it, said tensional forces being applied at locations separated from one another by a distance which is less than the width of the sheet material.

5. A method of longitudinally stretching a continuous sheet material such as an organic plastic sheet material of given thickness while preventing substantial narrowing of said material, said method comprising softening the material by directing radiated heat from a source in spaced relation to said material toward said material along a relatively narrow band extending transversely of the sheet and terminating short of the edges thereof, softening the material which extends transversely beyond the ends of said band to said edges to a lesser extent than the material within said band by directing a lesser amount of radiated heat toward said material whereby the transversely extended portions of the material adjacent the edges of the sheet are rendered less deformable than the material within said band and act to restrain narrowing of the sheet while it is being stretched longitudinally, and subjecting the sheet material to the simultaneous influence of a pair of opposed tensional forces applied to act lengthwise of the material at spaced-apart locations longitudinally of the material to each side of said band and transversely extended portions to draw and move the material lengthwise of itself at a given speed while applying a longitudinal stretch to the material which tends to lengthen and thin it.

References Cited in the file of this patent
UNITED STATES PATENTS

| | | |
|---|---|---|
| 2,297,645 | Bailey | Sept. 29, 1942 |
| 2,335,190 | Minich | Nov. 23, 1943 |
| 2,547,763 | Land et al. | Apr. 3, 1951 |